United States Patent [19]

Broers et al.

[11] 3,810,302
[45] May 14, 1974

[54] METHOD OF MANUFACTURING A WAVE-GUIDE

[75] Inventors: Godefridus Henricus Broers; Johannes Van Esdonk, both of Emmasingel, Eindhoven, Netherlands

[73] Assignee: U.S. Philips Corporation, New York, N.Y.

[22] Filed: Dec. 6, 1972

[21] Appl. No.: 312,688

[30] Foreign Application Priority Data
Dec. 9, 1971  Netherlands...................... 7116881

[52] U.S. Cl. .................................. 29/600, 72/369
[51] Int. Cl. ........................................... H01p 1/00
[58] Field of Search 29/600, 423 R, 423 X, 423 UX; 333/95 R, 98 R; 72/369, 370, 466, DIG. 14

[56] References Cited
UNITED STATES PATENTS

| | | | |
|---|---|---|---|
| 3,641,665 | 2/1972 | Matricon | 29/423 |
| 1,396,918 | 11/1921 | Brace | 29/423 |
| 1,980,716 | 11/1934 | Colwell | 29/423 |
| 3,374,532 | 3/1968 | Zenhausern | 72/369 |
| 1,693,487 | 11/1928 | Mansfield | 29/423 |
| 1,763,651 | 6/1930 | Gumaelius | 29/423 |
| 2,373,405 | 4/1945 | Lowit | 29/423 |
| 3,585,540 | 6/1971 | Schuttioffel et al. | 333/95 A |
| 3,403,543 | 10/1968 | Gregory et al. | 72/370 |

Primary Examiner—Charles W. Lanham
Assistant Examiner—James R. Duzan
Attorney, Agent, or Firm—Frank R. Trifari

[57] ABSTRACT

A method of manufacturing a flat waveguide in which a hollow core of a soft metal is introduced into a steel tube, this assembly is then provided with two parallel flat faces by flattening the tube with the core on two sides, after which the core is removed by etching. By using a hollow core, elongation, contraction and tearing of the wall of the tube is prevented. The flat tube obtained by the method according to the invention has a smooth and regular inner surface and a uniform wall thickness.

5 Claims, 6 Drawing Figures

PATENTED MAY 14 1974 3,810,302

METHOD OF MANUFACTURING A WAVE-GUIDE

The invention relates to a method of manufacturing a waveguide having at least one cylindrical and one flat part, in which a metal core is introduced into a straight cylindrical steel tube, the tube is then provided with two parallel flat faces by flattening a part of the assembly on two sides, after which the core is removed by etching.

One of the requirements imposed upon a waveguide is that the inner surface must be entirely smooth and may not show local unevennesses.

For the manufacture of flat waveguides it is known to fill a steel tube entirely with a solid cylindrical core of a soft metal. During flattening the circumference of the core becomes larger with the same surface in cross-section, while the tube tends to maintain the same circumference. This known method therefore has the drawback that by variation of the ratio surface in cross-section/circumference of the tube and of the core, the wall of the tube is elongated as a result of which such a deformation occurs that the flat parts of the waveguide show a non-uniform wall thickness. In tubes having a proportionally large diameter and wall thickness, the elongation may even result in tearing of the wall of the tube. Moreover, etching away of the core which depends upon the length of the waveguide is very time-consuming.

It is the object of the present invention to provide a method which does not exhibit these drawbacks and which enables the manufacture of flattened waveguides the flat parts of which show a uniform wall thickness, a smooth internal surface and close cross-sectional tolerances.

According to the invention this object is mainly achieved in that a hollow core is used the surface of which, viewed in cross-section, is at most equal to the surface of the passage of the flat part of the waveguide to be obtained. The hollow core comprises one or several bores as a result of which a reduction of the volume of the mass of the core is obtained during flattening and elongation of the wall of the tube is prevented. Moreover, etching liquid can be pressed or drawn in through remaining slits as a result of which the etching time can be considerably reduced.

The possibility of tearing of the wall of the tube is even larger in manufacturing a bent waveguide in which the flat faces are located on the bent portion parallel to the plane through the center line of the guide. In a preferred embodiment of the method according to the invention the hollow core is advantageously used in that, after introducing the core into the tube and prior to the flattening of the assembly, the tube with the core is bent through a previously determined angle.

The etching time can be even further reduced in that in another preferred embodiment of the method according to the invention a duct is formed in the flattened core for the circulation of etching liquid by using a hollow core of which, viewed in cross-section, the surface is smaller than the surface of the passage of the flat part of the guide to be obtained. The cavities in the core are previously proportioned so that the core, after the flattening of the assembly to the desired dimensions, is not completely squeezed.

A waveguide manufactured by the method according to the invention is characterized by the uniform wall thickness of the flat part of the guide as well as by the even and smooth surface hereof both on the inside and on the outside.

The invention will be described in greater detail with reference to embodiments shown in the drawing.

Figure 1:
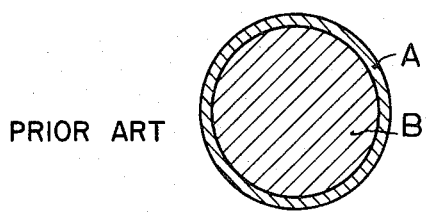
FIG. 1 shows an assembly to be flattened with a solid core.
Figure 2:
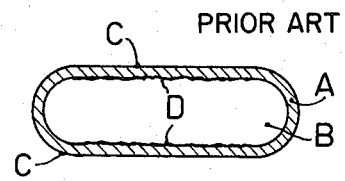
FIG. 2 shows a waveguide flattened according to the known method after etching away the core.

For the manufacture of a flat wave guide by the known method, a steel tube A, for example of chromium-nickel steel, shown in FIG. 1 in cross-section, is entirely filled with a solid core B of a soft metal, for example aluminium. The tube A is then provided with two flat faces by flattening a part of the tube with the core B on two sides, after which the core is removed by etching. FIG. 2 is a cross-sectional view of the flat part of the waveguide obtained in this manner with the flat faces C. As already explained during flattening a variation occurs of the ratio circumference-cross-section of the tube A and the core B. The result of this is that the wall of the tube is elongated and the flat tube portions are visibly deformed. In FIG. 2, D denotes the irregular deformed internal surface of the flat faces C. It has been found in practice that with tubes having a diameter of 25 mm and more, such a deformation occurs that contraction and ultimate tearing of the wall of the tube occurs.

Figure 3:
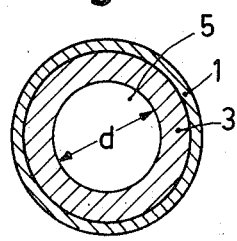
FIG. 3 shows an assembly with a hollow core to be flattened by the method according to the invention.
Figure 4:
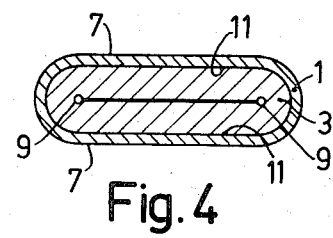
FIG. 4 shows the assembly of FIG. 3 after flattening.

In order to prevent elongation, contraction and tearing of the wall of the tube, according to the invention a hollow core is used. FIG. 3 is a cross-sectional view of a steel tube 1 with a core 3 to be flattened, which core has a central bore 5 the diameter $d$ of which determines the final cross-section of the flat part of the tube. For that purpose, the diameter $d$ is previously chosen to be so that the flat tube portion shown in FIG. 4 with the flat faces 7 is filled by the mass of the core 3 with the exception of two remaining small ducts 9. The flat faces 7 have a uniform wall thickness and a smooth and regular inner surface 11. Etching liquid can be pressed or drawn-in through the ducts 9 as a result of which the etching time becomes shorter. In a practical case, the etching time, compared with the known method, could be reduced from approximately 4 weeks to approximately 6 hours.

Figure 5:
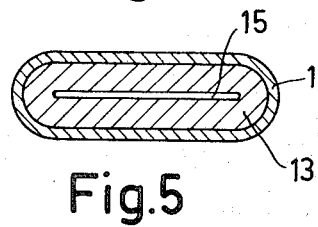
FIG. 5 shows a flattened assembly obtained according to another embodiment of the method according to the invention.

FIG. 5 is a cross-sectional view of a flattened tube part with a core 13, the bore of which originally had such a diameter that after flattening of the assembly to the desired dimensions a channel 15 remains in the core which constitutes a duct for the circulation of etching liquid. As a result of the better and more intensive circulation of the etching liquid, the etching time can be further reduced.

Figure 6:
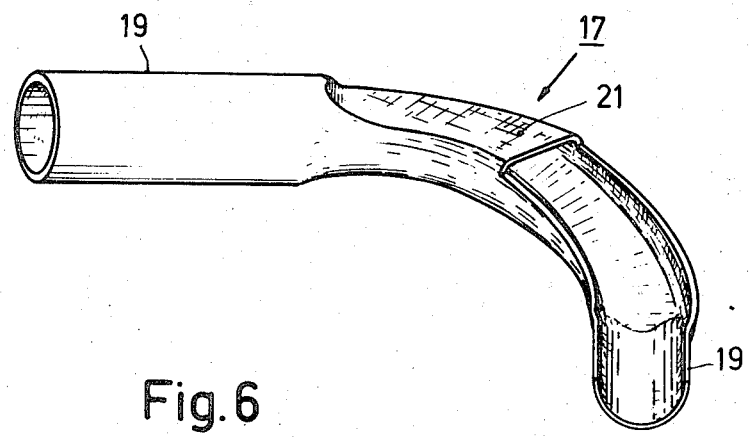
FIG. 6 is a perspective view of a bent and flattened waveguide manufactured by the method according to the invention.

FIG. 6 is a perspective view and partly a longitudinal cross-sectional view of a wave-guide 17 obtained by the method according to the invention and bent through an angle of 90°, having two cylindrical ends 19 and a flat intermediate section 21 on the bent part, the flattenings having been provided after bending. In such a practical embodiment, the original steel tube had an outside diameter of 16 mm and a wall thickness of 1.5 mm, while the free height between the flat faces was 7 mm.

The method according to the invention enables the manufacture of flat, both straight and bent waveguides, in which steel tubes up to a diameter of 100 mm can be handled.

What is claimed is:

1. A method of manufacturing a wave-guide comprising the steps of introducing a cylindrical tubular core of a corrodible metal into a straight, cylindrical tube of a chemically resistant metal, flattening at least a portion of the resulting assembly on two opposite sides thereof and removing the core by etching.

2. A method as claimed in claim 1 of manufacturing a bent waveguide in which the flat faces are located on the bent portion parallel to the plane through the center line of the guide, characterized in that after introducing the core into the tube and prior to the flattening of the assembly, the tube with the core is bent through a previously determined angle.

3. A method as claimed in claim 1, characterized in that a duct for the circulation of etching liquid is formed by using a tubular core the end surface of which, viewed in cross-section, is smaller than the cross-sectional area of the passage of the flattened portion of the wave-guide to be obtained.

4. A method as claimed in claim 1, wherein the cross-sectional, annular surface of said core is at most equal to the cross-sectional area of the open passage in the part to be flattened.

5. A method as claimed in claim 1, wherein said chemically resistant metal is steel.

* * * * *